(No Model.)

E. J. BLOOD.
Tag Adjuster.

No. 231,646.　　　　　　Patented Aug. 31, 1880.

Witnesses
W. C. Corlies
Jno. C. MacGregor

Inventor
Edwin J. Blood
By Coburn & Thacher
Attorneys

UNITED STATES PATENT OFFICE.

EDWIN J. BLOOD, OF CHICAGO, ILLINOIS.

TUG-ADJUSTER.

SPECIFICATION forming part of Letters Patent No. 231,646, dated August 31, 1880.

Application filed May 24, 1880. (No model.)

*To all whom it may concern:*

Be it known that I, EDWIN J. BLOOD, of Chicago, in the county of Cook and State of Illinois, have invented a certain new and useful Improvement in Tug-Adjusters, (Case C;) and I hereby declare that the following is a full, clear, and exact description of the same, reference being had to the accompanying drawings, in which—

Figure 1:
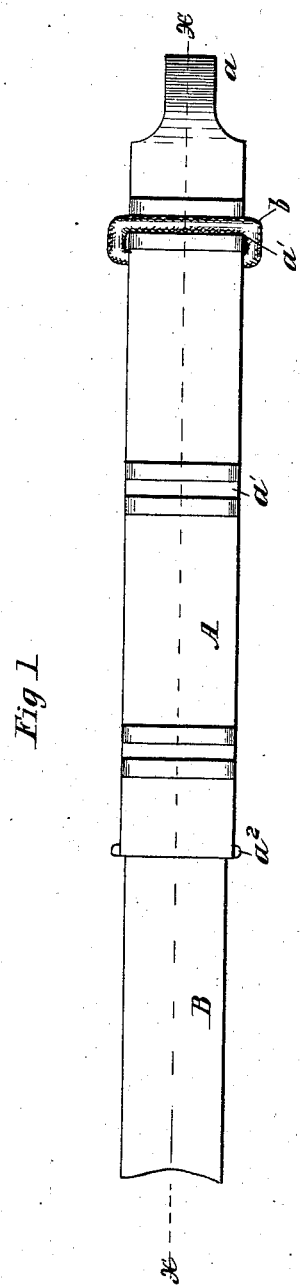
Figure 2:
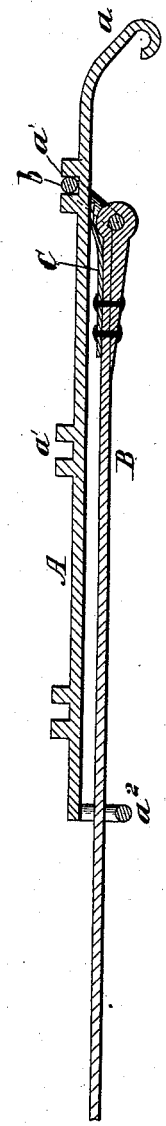
Figure 3:
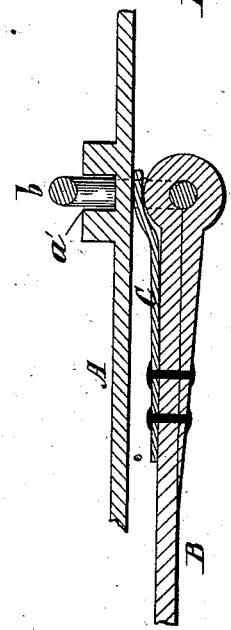

Figure 1 is a plan view of my invention. Fig. 2 is a longitudinal vertical section of the same on the line $x\ x$ in Fig. 1; and Fig. 3 is a similar section of part, on an enlarged scale, showing the mode of attachment.

The same letters denote the same parts in all the figures.

My invention relates to draft-harness and other apparatus involving the use of connecting-straps; and it consists in a device for varying the length of such connections, which device I will now proceed to describe.

In the drawings, A denotes a bar forming a base-extension of the tug-hook $a$, connecting the tug with the hame, or of any analogous attachment. This bar at sundry points in its length is crossed on its upper surface by grooves $a'$, each preferably formed by two transverse projections or cleats on the upper surface of the bar, as shown in the drawings. At or near the end farthest from the hook a guide, $a^2$, projects from the under surface of the bar at right angles, or nearly so, to the surface.

The tug-strap B has attached to it at one end, in any suitable way, a link, $b$, so shaped that its upper portion will fit into either of the grooves $a'$—not so closely, however, but that it may be readily lifted out or let into the groove. To the upper surface of the strap is attached a spring, C, so made and placed that when the link $b$ rests in one of the grooves the spring will press on the under side of the bar and by its pressure hold the bar and the end of the strap so far apart that the link will be held firmly down in the groove and cannot be dislodged by any tension or slackening of the strap.

By pressing the bar and the end of the strap together the elasticity of the spring may be overcome and the link lifted out of its groove and slid along the bar to another groove, thereby lengthening or shortening at pleasure the distance between the hook $a$ and the farther end of the strap.

The guide $a^2$, through which the strap B passes, serves to keep the strap parallel with the bar. In the preferable construction, in which the link is attached to the strap by a loop in one end of the latter, so that they turn freely on each other, this confinement of the strap in the guide prevents any accidental turning of the strap, so as to bring the spring on the side of the strap farthest from the bar, and thus destroy its efficacy.

What I claim as my invention, and desire to secure by Letters Patent, is—

1. As a connecting device, the bar A, having the hook $a$ and transverse grooves $a'$, in combination with the strap B, link $b$, and spring C, arranged and operating substantially as described.

2. As a connecting device, the bar A, having the hook $a$, transverse grooves $a'$, and guide $a^2$, in combination with the strap B, link $b$, and spring C, arranged and operating substantially as described.

EDWIN J. BLOOD.

Witnesses:
JNO. C. MACGREGOR,
THOMAS H. PEASE.